United States Patent [19]
Mayeaux

[11] Patent Number: 5,878,771
[45] Date of Patent: *Mar. 9, 1999

[54] PRECISION GAS BLENDER

[76] Inventor: Paul Howard Mayeaux, 10606 Piping Rock, Houston, Tex. 77042

[ * ] Notice: The term of this patent shall not extend beyond the expiration date of Pat. No. 5,540,251.

[21] Appl. No.: 681,726

[22] Filed: Jul. 29, 1996

Related U.S. Application Data

[63] Continuation-in-part of Ser. No. 192,297, Feb. 1, 1994, Pat. No. 5,540,251.

[51] Int. Cl.$^6$ .................................................. G05D 11/13
[52] U.S. Cl. ................................ 137/88; 137/7; 137/607; 137/898; 251/129.05; 251/210
[58] Field of Search .................................. 137/7, 88, 597, 137/625.48, 606, 607, 897, 898, 613; 251/210, 129.05, 54

[56] References Cited

U.S. PATENT DOCUMENTS

| | | | |
|---|---|---|---|
| 3,817,658 | 6/1974 | Murase ................................ | 137/88 X |
| 3,948,281 | 4/1976 | Strain et al. ................................ | 137/3 |
| 4,275,752 | 6/1981 | Collier et al. ............................ | 137/88 |
| 5,165,652 | 11/1992 | Nicolaisen ................................ | 251/54 |
| 5,540,251 | 7/1996 | Mayeaux ................................ | 137/88 |

FOREIGN PATENT DOCUMENTS

0020912  2/1980  Japan ........................................ 251/54

Primary Examiner—John Rivell
Attorney, Agent, or Firm—Akin, Gump, Strauss, Hauer & Feld, L.L.P.

[57] ABSTRACT

Apparatus and methods for precision batch or continuous flow blending of gases are described. Pulsatile precision metering valves having substantially zero dead space are employed to introduce gases to a mixing chamber or manifold in predictable uniform quantities to achieve precision gas blends according to predetermined criteria. During batch processing, gases to be blended are repeatedly characterized by the change in mixing vessel pressure with respect to time immediately after blending. Estimates of additional amounts of a given gas to be added to achieve a desired final partial pressure of the given gas in the mixing vessel are based on empirical data previously measured and stored for the gas in question.

12 Claims, 4 Drawing Sheets

Fig. 4

PRECISION GAS BLENDER

This application is a continuation-in-part of application Ser. No. 08/192,297 filed 1 Feb., 1994, now U.S. Pat. No. 5,540,251, issued 30 Jul., 1996.

BACKGROUND

1. Field of the Invention

This invention relates to methods and apparatus for preparing gas mixtures of predetermined composition.

2. Use and Preparation of Gas Mixtures

Accurately determined gas mixtures (the term gas as used herein includes vapors) are in widespread use as calibration or reference standards for analytical instrumentation and as feed stock for scaled down chemical reactions or processes, particularly in research and development. Thus, there is a need for mixtures of component gases in precisely predetermined proportions, and a corresponding need for methods and apparatus for the accurate production of such gaseous blends.

Commercial bottled gas and vapor mixtures of known composition are widely available for use in analytical instrumentation. The proportion of each gas component in a bottle is usually fixed when the gas is pressurized at the bottling plant, but for certain applications it is convenient for a user to mix specified quantities of two or more bottled gases to obtain a gas mixture having a specified predetermined composition different from that of the bottled gases. This composition is preferably variable by the user according to local need.

Currently available methods for the local preparation of gas mixtures by a user incorporate mass flow and permeation techniques. These methods typically use dynamic devices in which blending occurs only when gas components are flowing. These techniques are relatively inaccurate and lend themselves to applications requiring few gas components in the mixture. Indeed, some of the devices are only effective for producing specific mixtures. An example of this technique is disclosed in U.S. Pat. No. 3,948,281, incorporated herein by reference.

In contrast to the above methods, commercial preparation of gas mixtures is usually by a gravimetric technique, in which a gas-containing vessel is weighed, or by a partial pressure technique. For several reasons, neither of these methods is adequate for the preparation of calibration gas blends suitable as reference standards for modern analytical instruments. The accuracy of the gravimetric method, for example, is dependent to a large degree on the weight of each component relative to the total weight of the vessel and its contents. This results in lower accuracies being attained in low density mixtures, such as hydrogen and helium, and also in situations where the components of interest are in low concentration.

The partial pressure method also has limited accuracy because the high pressures required to make the process commercially feasible can compound errors caused either by the absence of precise temperature control during compression, expansion and blending of the gases, or inhomogeneities in the resulting intermediate and final gas mixtures. Consequently, the partial pressure method of blending gases has not been found to be particularly suitable for the preparation of accurately measured gas blends, as for calibration gases.

A survey of topics related to production of gas mixtures is presented in the 1975 copyrighted book *Gas Mixtures—Facts and Fables* by Frank Scarporoicer, available from Matheson Gas Products Company, 932 Paterson Plank Road, P.O. Box 85, East Rutherford, N.J. 07073; the book is hereby incorporated by reference for indicating the background of the invention and illustrating the state of the art.

3. Preparation of Calibration Gas Mixtures

Gas mixtures for instrument calibration frequently contain very low concentrations of one or more component gases and are particularly difficult to prepare accurately. Their manufacture often requires elaborate procedures, some of which are suitable only for specific compounds. For example, gas permeation, which is a dynamic technique, requires precision temperature control; it is sensitive to active component life and has a narrow range of applicability. In general, gas mixtures prepared with high concentrations of one or more component gases together with low concentrations of one or more other gases must be analyzed in a separate procedure to confirm the desired concentration of each component gas.

U.S. Pat. No. 4,142,860, incorporated herein by reference, discloses an apparatus for the production of calibration gas mixtures. The apparatus includes a pressurized gas mixing vessel of large thermal inertia relative to that of the component gases blended therein, this unit serving to aid in the control of temperature fluctuations. The apparatus also includes a movable stirring element disposed within the mixing vessel to aid in mixing gases which are added to the vessel from a plurality of externally located pressurized tanks via a plurality of inlet valves mounted on the vessel. A pressure transducer measures the gas pressure in the mixing vessel, and an indicator displays the pressure reading.

In operation, the mixing vessel can be purged and evacuated, the component gases then being added seriately and stirred to produce a calibration gas mixture. One problem with this apparatus is that the inlet valves contain significant gas volume which is substantially isolated from the gas mixing action of the stirring element.

U.S. Pat. No. 4,254,797, incorporated herein by reference, discloses an apparatus for the production of calibration gas mixtures which is improved over that shown in the '860 patent. The apparatus described in the '797 patent has proven satisfactory for blending component gases in accurately measured quantities, but it includes a closed loop gas path for providing gases to the mixing vessel. This closed loop path contains spaces wherein small amounts of gas can remain sequestered even after the system had been purged, thereby reducing the accuracy of the gas blending system. Additionally, a pressure transducer location remote from the mixing vessel results in substantial isolation of a portion of the contained gas from the gas mixing action of the stirring element.

Thus, substantial elimination of gas sequestration, together with improved mixing and increased accuracy and repeatability, would be desirable improvements in existing apparatus for producing calibration gas mixtures.

SUMMARY OF THE INVENTION

The present invention comprises improved apparatus and methods for batch or continuous flow blending of a plurality of component gases in accurately measured quantities to provide calibration gas mixtures. For batch processing, the present invention includes a mixing vessel in which component gases are mixed, the vessel preferably having large mass relative to the total mass of component gases mixed therein. At least two precision pulsatile gas metering valves are directly mounted on the mixing vessel and communicate therewith (communication as used herein means allowing and/or facilitating the passage of gas into and/or out of or between the space(s) with which communication is established).

Each metering valve has substantially zero dead space and may be used to inject under pressure predetermined quantities of gas into the vessel. A pressure transducer (also with substantially zero dead space) mounts directly on the gas mixing vessel and produces an output signal indicative of the measured gas pressure within the vessel. A circulating fan is mounted on the mixing vessel for mixing any gas therein with additional gas injected into the vessel through one or more of the metering valves. Also communicating with the mixing vessel are a vent valve (in preferred embodiments) for venting gas within the mixing vessel to achieve an (internal) mixing vessel gas pressure substantially equal to ambient pressure, an outlet valve for withdrawing calibration gas mixtures from the vessel, and a vacuum valve for connection to a vacuum line for evacuating the vessel in preparation for introduction of predetermined gases into the vessel.

Preferred embodiments of the present invention may additionally comprise a calibration valve (with substantially zero dead space) to zero the pressure transducer and a computer for controlling the valves and fan, the computer being coupled to the pressure transducer output signal and being capable of storing a plurality of measured gas pressures as a function of time following addition of (i.e., injection of) gases into the mixing vessel. To further enhance repeatability of the mass of gas in each single gas pulse injected by each metering valve, the gas pressure drop across each metering valve is preferably held substantially constant from pulse-to-pulse with pressure drop control means. Pressure drop control means comprise, for example, a gas pressure regulator in line between each component gas source and its respective metering valve. The regulated gas pressure thus applied to the gas inlet of each metering valve, in turn, is preferably referenced to mixing vessel pressure (that is, it is preferably not referenced to ambient pressure in these preferred embodiments) so that each metering valve has a substantially constant gas pressure across it notwithstanding changes in mixing vessel pressure. In such preferred embodiments, the pressure line which transmits mixing vessel pressure to each regulator may itself preferably have one or more valves in series which close (and thus no longer transmit pressure) above a predetermined mixing vessel pressure (to prevent excessive mixing vessel pressures).

For continuous flow gas blending, a plurality of precision pulsatile metering valves deliver gas which is ultimately directed to a manifold. Before entry into the manifold, the pulsatile gas flow from each valve passes through a pneumatic smoothing filter which converts the pulsatile flow to a substantially constant rate gas flow. Thus, gas flowing at a precisely determined and substantially uniform rate from each smoothing filter is directed to a manifold, being mixed during transit through the manifold and emerging therefrom as a gas mixture of substantially uniform composition containing a precisely predetermined percentage of each of a plurality of gases. The percentage of any gas in the mixture can be adjusted in steps, the size of each step corresponding to the amount of gas within a single pulse from the valve, as well as the total gas flow from the mixer per unit time.

Each precision metering valve of the present invention acts substantially as a positive displacement pump having a piston movable in a hollow cylinder and being capable of injecting (under pressure) a predetermined and substantially uniform mass of gas (i.e., the injected gas measure) into the batch mixing vessel or continuous flow manifold with each injection stroke of its piston. A gas inlet in the valve body communicates with an internal gas passage, which in turn communicates with the hollow cylinder. A gas outlet also communicates with the hollow cylinder. The internal gas passage and the portion of the hollow cylinder with which it communicates preferably comprise a pneumatic resonant cavity having a plurality of resonant frequencies, including a fundamental resonant frequency and integer multiples thereof (all resonant frequencies being identified herein when integers greater than or equal to one are considered). Reciprocating motion imparted to the piston (with respect to the cylinder) by a piston driver preferably has a frequency substantially equal to an integer multiple of the resonant frequency wherein the integer is equal to or greater than one. Such reciprocating motion allows one to obtain from the metering valve substantially uniform injected gas measures when the gas supply pressure and the gas pressure drop across the valve are substantially constant.

Cylinder sealing means to substantially prevent gas leakage between the mixing valve piston and cylinder preferably comprise at least one O-ring in a circumferential groove on the piston, the groove preferably being elongated. An elongated groove allows relative movement between the O-ring and piston without requiring relative movement between the O-ring and the valve cylinder wall. Thus, friction tending to retard piston movement is reduced and valve responsiveness (related to piston velocity) is increased.

Metering valves of the present invention also have an outlet sealing means preferably comprising an O-ring seal and/or an elastomeric end cap coupled to a piston seal retainer projecting from the end of the piston closest to the valve gas outlet. When the piston is proximate the valve gas outlet and at least a portion of the O-ring retainer lies within a recess in the valve cylinder end, this O-ring seals the outlet, effectively preventing gas flow in either direction. This sealing action, in combination with the elastomeric end cap projecting into the gas outlet, the frusto-conical shape of the gas outlet, and (in preferred embodiments) a recessed portion of the outer valve body surrounding the gas outlet, substantially eliminates the dead space associated with the valve.

Note that the outlet-sealing O-ring differs from the O-ring in the circumferential piston groove. The latter O-ring (acting as cylinder sealing means) effectively separates the valve cylinder into a first portion (through which gas passes on its way into the mixing vessel) and a second portion (effectively a closed space). The second portion closed space may act as a pneumatic spring which can affect the resonant frequency of the piston's reciprocating motion in the cylinder. The effective spring rate and damping of this pneumatic spring (and thus the resonant frequency of the piston's reciprocating motion) can be adjusted by changing the composition (that is, the density and/or viscosity) and/or the pressure of the (spring) gas within the second portion closed space through spring gas adjustment means. Hence, preferred embodiments of the precision gas blender may comprise a plurality of precision pulsatile metering valves having spring gas adjustment means which facilitate use of various spring gas compositions and/or pressures. Spring gas adjustment means, in turn, comprise at least one second portion gas port communicating with a gas pressure regulator. The gas pressure regulator thus acts as an interface between certain embodiments of the precision gas blender and one or more sources of spring gas.

In another preferred embodiment of the precision gas blender, provision is made to introduce spring gas into the second portion closed space of each metering valve at a pressure substantially exceeding the gas pressure in the metering valve cylinder first portion. In each such metering valve, this condition will drive the piston toward the valve cylinder first end and hold it there (in the closed position) until the spring gas pressure in the second portion closed space is reduced. Such a piston position is particularly useful when the precision gas blender is to be transported in a high-vibration environment because (due to the cylinder sealing means and outlet sealing means acting together) the piston is effectively shock-mounted in a substantially fixed (closed) position within the cylinder. In addition to avoiding undesirable vibration-induced contact (and the resulting wear) between piston and cylinder, this closed position effectively seals the mixing vessel against the entry of particulate foreign matter that may be dislodged by the vibration.

The present invention further comprises a novel method for rapidly characterizing each gaseous component to be added to a gas mixture through a metering valve, and of determining the amount of such gaseous component to be added to a mixing vessel for batch production of calibration gas mixtures of predetermined composition. Characterization of gaseous components is accomplished by examination of mixing vessel pressure as a function of time after a gas is added to the vessel (i.e., a pressure-time plot). Each gas to be added to a calibration mixture is associated with a family of pressure-time plots, with slope of the plots being influenced by the quantity and type of other gases in the vessel. While the family of plots descriptive of a certain gas component at various partial pressures in combination with other gases is difficult to describe analytically, it may be determined empirically and stored for use in future comparisons.

DETAILED DESCRIPTION

The magnitude and substantial uniformity of injected gas measures for preferred embodiments of precision metering valves of the present invention are determined through interaction of at least three metering valve operation parameters, i.e., the source gas pressure, the fundamental resonant frequency (and integer multiples thereof) of the pneumatic resonant cavity comprising the valve's internal gas passage and that portion of the hollow valve cylinder communicating with the valve's internal gas passage, and the frequency of piston reciprocating motion (reciprocating frequency) within the hollow valve cylinder. Through adjustment of these parameters, the valve may be tuned to achieve standing waves (having a resonant frequency) in at least a portion of the gas within its pneumatic resonant cavity, preferably that portion within the hollow cylinder. The presence of standing waves in this portion of the gas within a valve implies a highly stable and repeatable pattern of gas distribution which is compressed by the piston on each compression (injection) stroke and simultaneously injected into the mixing vessel.

Note that in embodiments of the precision gas blender comprising spring gas adjustment means, the piston's reciprocating frequency will preferably be substantially equal to a resonant frequency of the piston-spring gas system and, as noted above, simultaneously be substantially equal to a resonant frequency of the valve's pneumatic resonant cavity.

Figure 1A:
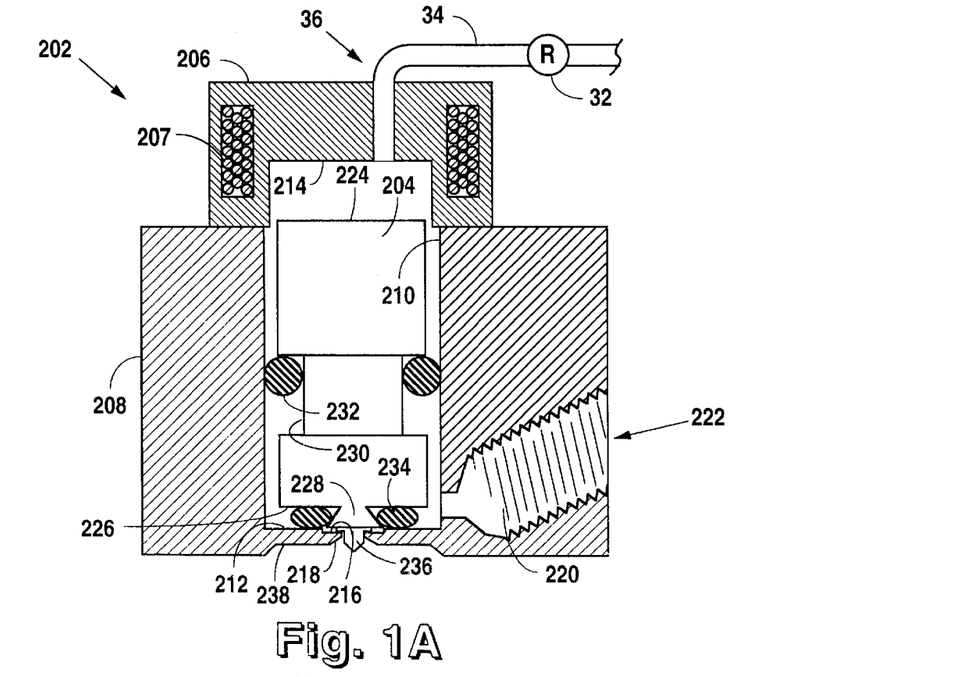
FIG. 1A schematically illustrates a cross-section of a portion of a precision pulsatile metering valve in the closed position.
Figure 1B:
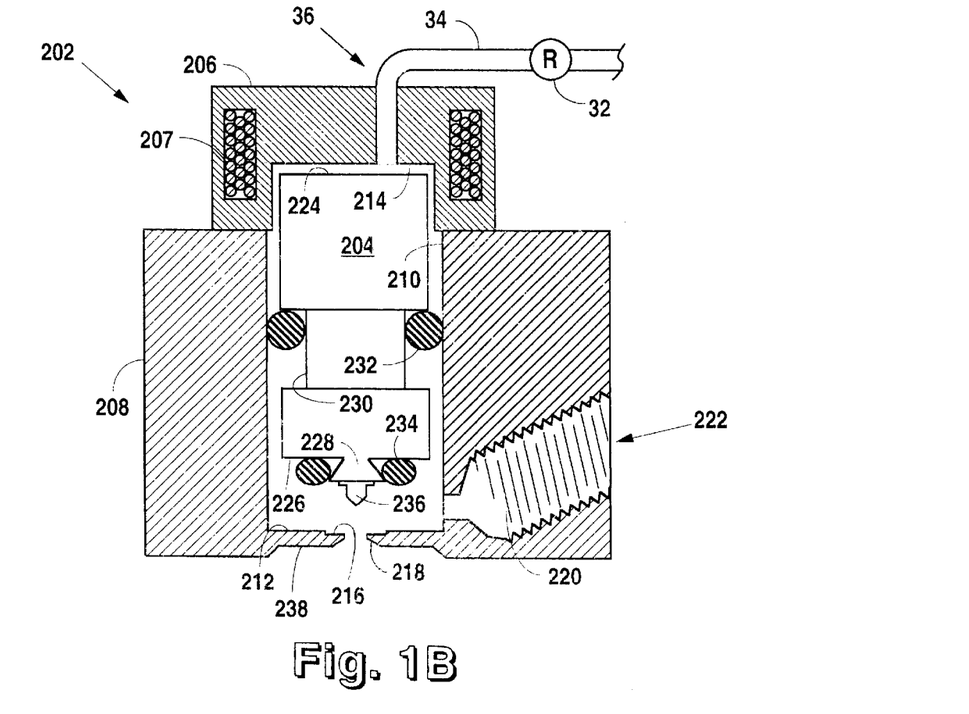
FIG. 1B schematically illustrates a cross-section of a portion of a precision pulsatile metering valve in the open position.

FIGS. 1A and 1B schematically illustrate cross-sectional views of a precision pulsatile metering valve 202 of the present invention with piston 204 in the closed position (FIG. 1A) and open position (FIG. 1B). Except when metering gas, the normal position of piston 204 is closed.

Valve body 208 comprises a hollow cylinder 210 having a first end 212 and a second end 214 and a recess 216 in the first end. Certain preferred embodiments of metering valve 202 comprise spring gas adjustment means which in turn may comprise, for example, a spring gas port 36 in second end 214 which can communicate via pipe 34 through gas pressure regulator 32 to a spring gas source (not shown). Valve body 208 further comprises a frusto-conically shaped gas outlet 218 communicating with recess 216 in hollow cylinder first end 212, and an internal gas passage 220 communicating with hollow cylinder 210. A gas inlet 222 communicates with internal gas passage 220. Preferred embodiments of metering valve 202 further comprise a recessed portion 238 of valve body 208 adjacent frusto-conically shaped gas outlet 218. Recessed portion 238 tends to create turbulence in gas passing over it, thereby enhancing gas mixing action in its vicinity and reducing dead space associated with metering valve 202.

Piston 204 has a first end 226, a second end 224, a seal retainer 228 coupled to first end 226, and a circumferential seal groove 230 which is preferably elongated (as shown in FIGS. 1A and 1B). Piston 204 is slidably positionable within hollow cylinder 210 and at least a portion of seal retainer 228 is positionable within hollow cylinder first end recess 216. Piston 204 substantially occludes internal gas passage 220 when positioned proximate hollow cylinder first end 212 and substantially does not occlude internal gas passage 220 when proximate hollow cylinder second end 214. Internal gas passage 220 and the portion of hollow cylinder 210 which communicates with internal gas passage 220 preferably comprise a pneumatic resonant cavity having a fundamental resonant frequency.

Piston driver 206 is coupled to piston 204 and valve body 208 to impart motion to piston 204 with respect to hollow cylinder 210 to slidably position piston 204 within hollow cylinder 210. Piston driver 206 may be coupled to piston 204 by, for example, mechanical, pneumatic, or electromagnetic means so as to be capable in preferred embodiments of imparting reciprocating motion to piston 204 at a reciprocating frequency. For the embodiment illustrated in FIGS. 1A and 1B, piston 204 is permanently magnetized and piston driver 206 is shown alternately repelling (FIG. 1A) and attracting (FIG. 1B) piston 204 through magnetic lines of force applied by coil 207.

Cylinder sealing means comprises in preferred embodiments at least one O-ring 232 within circumferential seal groove 230 to substantially prevent gas leakage between piston 204 and hollow cylinder 210 before, during and after positioning of piston 204 within hollow cylinder 210. Outlet sealing means comprise in preferred embodiments an O-ring 234 and/or an elastomeric end cap 236 coupled to said piston seal retainer 228. Elastomeric end cap 236 in particular tends to reduce dead space associated with frusto-conically shaped gas outlet 218 by filling potential dead space within the outlet with elastomer material when valve 202 is in the closed position (see FIG. 1A).

In practice, a valve of the present invention is tuned when the piston's reciprocating frequency substantially equals the fundamental resonant frequency of the valve's pneumatic resonant cavity or an integer multiple thereof. This fundamental resonant frequency, in turn, may be estimated analytically through acoustic analysis of the valve's pneumatic resonant cavity, or estimated empirically by operating a valve at a substantially constant supply gas pressure and over a range of reciprocating frequencies while measuring the uniformity of the injected gas measure at a plurality of reciprocating frequencies. The lowest reciprocating frequency at which substantial uniformity of injected gas measure is obtained from the valve is substantially equal to the fundamental resonant frequency.

Thus, the injected gas measure from a tuned gas metering valve of the present invention may be made highly uniform from injection pulse to injection pulse. Whether a valve's injection pulses occur singly or in a series, the injection cycle time for each injection pulse is the total time for a piston up-stroke which opens the valve, plus a piston injection stroke which ejects from the valve's gas outlet a quantity of gas substantially equal to the valve's injected gas measure and then closes the valve. For a given valve, the injection cycle time is preferably substantially equal to a constant which is the inverse of the preferred reciprocating frequency for that valve.

In addition to their suitability for operation as tuned pneumatic structures, metering valves of the present invention add substantially no dead space to the enclosed volume of a mixing vessel with which a valve communicates as described herein. Dead space, for purposes of the present invention, is defined as space within or adjacent to the valve which communicates with the space within a mixing vessel on which the valve is mounted but which is effectively shielded from the gas mixing action of the circulating fan within the mixing vessel. Such shielding allows inhomogeneities to exist in the concentration of gases in spaces communicating with the mixing vessel, and such inhomogeneities degrade the potential accuracy of the gas blender.

To substantially reduce dead space in gas blenders of the present invention, metering valves of the present invention comprise a frusto-conically shaped gas outlet to improve gas mixing in spaces communicating with the mixing vessel, especially that portion of the space immediately adjacent to each valve gas outlet. In preferred embodiments, dead space may be further reduced (in some embodiments substantially eliminated) through local turbulence induced by a recessed portion of the valve body adjacent the gas outlet.

Given substantially constant gas pressure drop across the valve over a desired time interval, the existence of standing waves within that portion of the gas stream which is to be compressed by the piston during an injection stroke promotes uniformity of gas pulses. The presentation of a substantially repeatable mass of gas to the compressive force of the piston with each injection stroke provides substantial pulse-to-pulse uniformity. Thus, gas mixture adjustment algorithms used with the precision gas blender (which rely on substantial pulse-to-pulse repeatability over relatively short time intervals) will yield gas mixtures of the desired high accuracy and precision. Because of the speed of piston movement and the relatively small quantity of gas compressed with each piston stroke, gas compression in a precision metering valve of the present invention is substantially adiabatic.

From the opening of the metering valve outlet port until the beginning of each piston injection stroke (i.e., during the piston up-stroke), the mass of gas about to be compressed communicates with the interior of the mixing vessel through the valve outlet port. Although the mixing vessel gas pressure may differ substantially from the pressure on the valve side of the valve outlet port, the relatively small outlet port diameter relative to its length prevents significant gas flow through the port in either direction during the time from valve opening to initiation of the piston injection stroke.

As a result of relatively high piston velocity and the presence (preferably) of one or more standing waves in the gas subject to being compressed by the piston, high gas pressures (relative to gas pressures in the mixing chamber) are repeatably developed under the piston during each compression stroke. Under conditions of substantially constant gas inlet pressure and temperature, peak pressures under the piston are substantially uniform from compression stroke to compression stroke for a given gas. Such peak pressures are substantially independent of mixing chamber pressures because of the relatively small size of the gas outlet and the fact that peak pressures under the piston greatly exceed mixing chamber pressures. Pulse-to-pulse uniformity relying on this approximation is further enhanced in certain embodiments through close control of gas pressure drop across the valve as described above. Thus, the injected gas measure should not vary significantly from compression stroke to compression stroke (that is, pulse-to-pulse) with any given gas being metered through a given valve.

Substantial back-flow of gas from the valve compression chamber toward the valve inlet port during the piston injection stroke is substantially prevented by the close fit of the piston to the compression chamber walls. Thus, gas backflow during the piston injection stroke is substantially prevented without the requirement for a check valve in the inlet gas stream.

Note that metering valves of the present invention operate in substantially the same manner whether delivering either a single injected gas measure or a sequence of injected gas measures of substantially uniform size (except for the preferred presence of standing waves in the pneumatic resonant cavity in the latter case). Any desired quantity of gas may be directed through a metering valve in increments of a single injected gas measure, the increments being made even more uniform in certain preferred embodiments through use of pressure drop control means for each metering valve, as described above. Precision in delivering predetermined quantities of gas through a metering valve may be increased as desired by reducing the size of a single injected gas measure through adjustment of the above cited valve operation parameters.

Note also that while the uniform injected gas measure for a specific metering valve is predetermined (ie., fixed) by the supply gas pressure and temperature and the valve operation parameters, the measure is preferably quantified empirically. That is, a specific metering valve may be calibrated under certain conditions by independent measurement of the injected gas measure. In apparatus for batch production of calibration gas mixtures, the metering valves need not be precisely calibrated because the method illustrated in FIG. 4 automatically determines the amount of gas to be added in increments of the (empirically characterized) injected gas measure for the gas being added at that time. For precision continuous flow gas blending, on the other hand, accurate calibration of each metering valve with the gas to be metered is necessary and may be achieved through use of the valve in a batch blending mode, with subsequent analytical confirmation of the actual amount of a gas added to each batch combined with reference to the number of injected gas measures in the actual amount confirmed.

Assuming the mixing vessel walls are at a temperature different from that of the gas added to the vessel, the vessel gas pressure for a period of time after delivery will change as heat is exchanged between the added gas and the vessel wall. The rate of increase or decrease of gas pressure in the mixing vessel is a function of the latent heat of absorption of the gas added to the vessel and the temperature difference between the added gas and the vessel wall. Assuming the vessel wall has large thermal inertia relative to that of the gas within the vessel, any heat exchanged between the gas and the wall will not result in a significant change in wall temperature.

Thus, the measured rate of gas pressure change within the vessel is a function of the rate of heat exchange between the vessel wall and the gas within the mixing vessel and is characteristic of the added gas for each combination of gas partial pressures within the vessel. From empirically derived data tables (preferably stored in a computer or on memory media readable by a computer) of mixing vessel pressure over time, the increment of (steady state) partial pressure increase expected within the vessel with the addition of small amounts of a given gas (in increments of the injected gas measure of the given gas) may be calculated (e.g., by interpolation and/or extrapolation from the empirical data). Thus, to obtain any desired increase in partial pressure of a given gas in the mixing vessel, the metering valve controlling addition of the given gas to the mixing vessel may be pulsed (i.e., made to add an injected gas measure of the gas to the mixing vessel) a number of times derived from the above calculation. If the predetermined mixing vessel partial pressure for the given gas in the final desired gas blend is not achieved by a given gas addition (comprising one or more pulses) of gas, a subsequent addition of the given gas may be made, based on characterization of the given gas after the previous addition. To make the characterizations needed, the rate of change of mixing vessel internal pressure is monitored after each gas addition. Because the latent heat of absorption varies from gas to gas, the stored empirical data on mixing vessel pressure changes associated with gas additions allows the user to predict partial pressure changes on the basis of how the same (or substantially similar) gas behaved in the past in a similar situation. Thus, the user may determine the number of pulses required for the next gas addition to obtain the partial pressure of gas desired. In approaching a desired partial pressure, the mixing vessel pressure response tends to be increasingly repeatable, allowing relatively precise prediction of the total amount of gas (in terms of pulses) remaining to be injected. Once this has been determined, the precise number of pulses of pressure can be supplied to obtain the final partial pressure desired.

Figure 2:
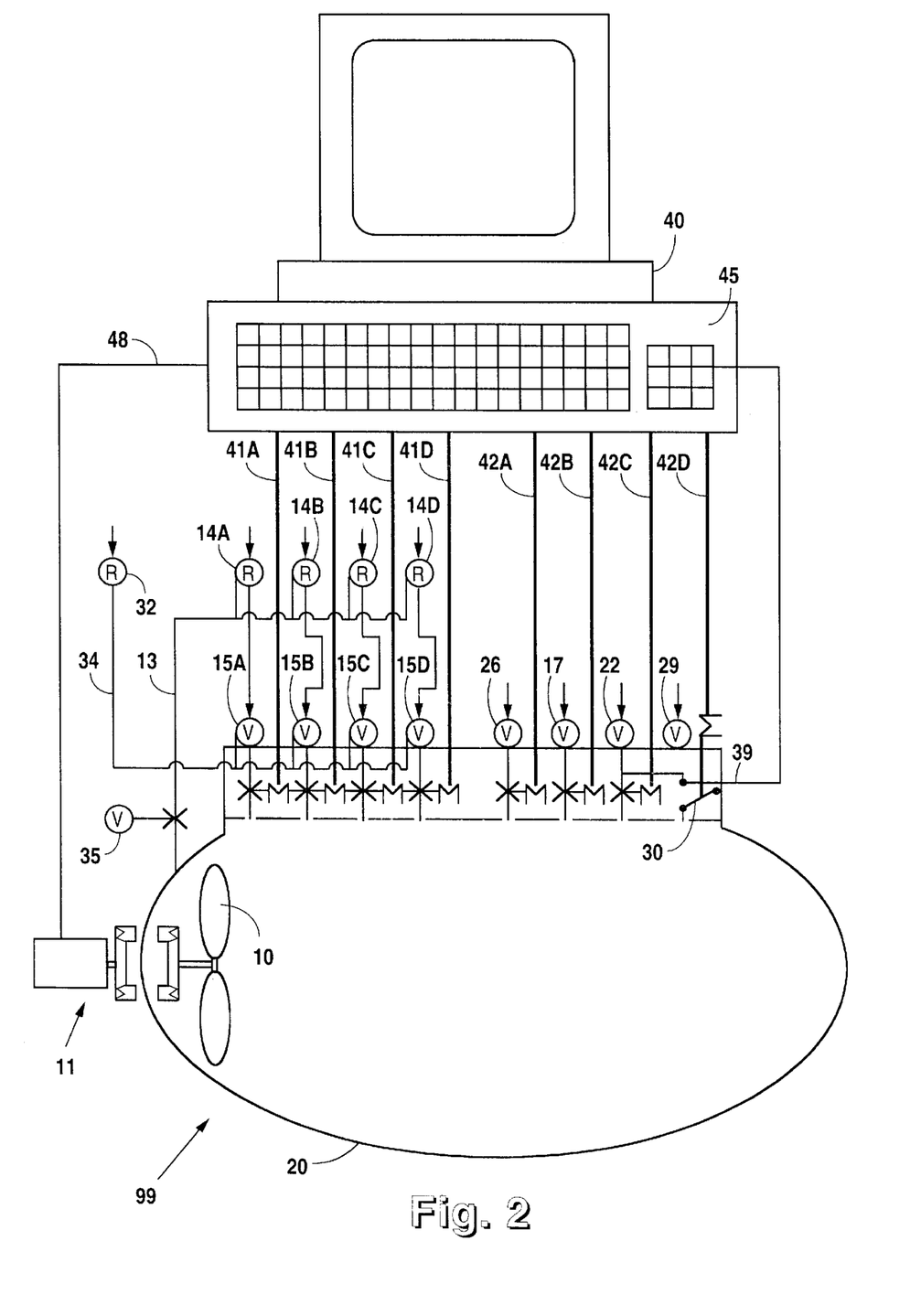
FIG. 2 schematically illustrates a preferred embodiment of a gas blender having computer controlled valves and gas mixing fan.

Referring now to FIG. 2, a gas blender 99 according to the preferred embodiment of the present invention is shown. Gas blender 99 includes a gas mixing vessel 20, preferably a spherical or ellipsoid form pressure vessel having sufficiently large thermal inertia so that its temperature will be substantially unchanged by any heat exchange with any of the gases to be mixed therein. Gas blender 99 also includes a plurality of precision pulsatile gas metering valves 15, each of which is connected to a different source of pressurized gas (not shown), for providing different gaseous components to blender 99. In the embodiment shown in FIG. 2, blender 99 is adapted for mixing four gases and thus comprises four gas metering valves 15A, 15B, 15C and 15D. Each of the metering valves 15A–D communicates through its respective gas pressure regulator 14A–D with an individual tank or other source of pressurized gas (not shown), so that the gas from each source is fed through its respective regulator and valve to the mixing vessel 20. Note that each regulator 14A–D is referenced to mixing vessel pressure which is transmitted to the respective regulators via pipe 13. The pressure line (pipe 13) which transmits mixing vessel pressure to each regulator is schematically illustrated as having a valve 35 in series which closes (and thus no longer transmits pressure through pipe 13 to regulators 14A–D) above a predetermined mixing vessel pressure (to prevent excessive mixing vessel pressures). Note also that spring gas from a source (not shown) is provided to valves 15A–D through gas pressure regulator 32 via pipe 34.

The choice of number, composition and type of gas sources (and the corresponding number of gas metering valves) is dependent on the application(s) planned for gas blender 99 and is not limited by the present invention. Mixing of gases to be blended within mixing vessel 20 is facilitated by fan 10, which is driven by fan drive 11, at least a portion of fan drive 11 preferably being located outside mixing vessel 20 to reduce dead space within mixing vessel 20.

Figure 3A:
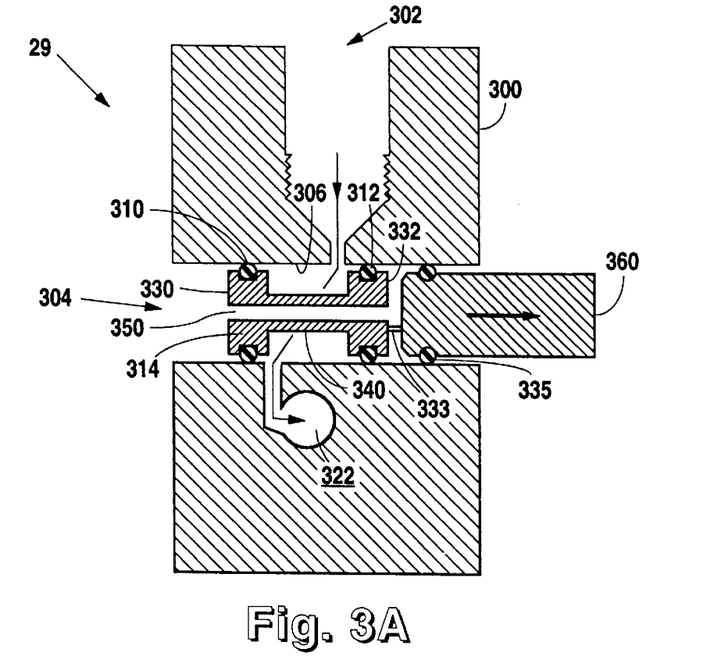
FIG. 3A schematically illustrates a calibration valve in position to zero a transducer.
Figure 3B:
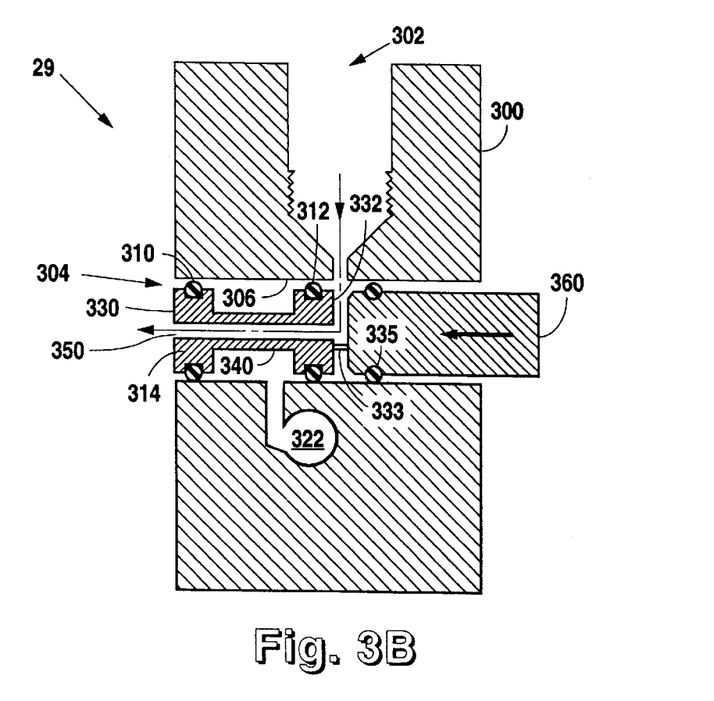
FIG. 3B schematically illustrates a calibration valve in position to allow measurement of mixing vessel pressure.

Four additional valves are illustrated in FIG. 2 as mounted on mixing vessel 20, i.e., a vacuum valve 22, a vent valve 17, a product output valve 26, and a calibration valve 29 (see FIGS. 3A and 3B). Calibration valve 29 is present in certain preferred embodiments of the present invention to increase the accuracy of absolute gas pressures measured within mixing vessel 20 using pressure transducer 30. It is possible but not required to mount pressure transducer 30 directly to valve body 300 at transducer access port 302 (see FIGS. 3A and 3B) to allow calibration valve 29 to switch transducer 30 to communication with vacuum inlet 322 only for zero point calibration and back to communication with mixing vessel 20 only to monitor gas pressure in mixing vessel 20. Vacuum inlet 322 communicates with a vacuum pump or analogous vacuum source (not shown). Switching transducer 30 to communicate with vacuum inlet 322 only removes all gas from potential dead volume areas within transducer 30 and calibration valve 29, thus minimizing dead volume associated with communication between transducer 30 and mixing vessel 20 when transducer 30 is switched to communication with mixing vessel 20 only. It is well known to those skilled in the art that the most difficult parameter to stabilize over time in connection with operation of transducer 30 is the zero point. Gas blenders of the present invention require accurate zero point calibration and linearity in transducer 30, but not absolute accuracy of any transducer reading other than zero. Thus, use of calibration valve 29 as described above tends to correct for any drift of zero point calibration in transducer 30 and improves the precision of preferred embodiments of gas blenders of the present invention.

Referring to FIGS. 3A and 3B, calibration valve 29 facilitates zero point calibration of pressure transducer 30 and also can establish communication between pressure transducer 30 and mixing vessel 20 to measure gas pressure within mixing vessel 20, as schematically illustrated. Calibration valve 29 comprises a valve body 300 which itself comprises a transducer access port 302, a hollow internal gas passage 306 communicating with transducer access port 302, a vacuum port 322 communicating with internal gas passage 306, and a mixing vessel access port 304 communicating with internal gas passage 306. Calibration valve 29 further comprises a sliding valve 314 which is slidably positionable within internal gas passage 306 to at least a sliding valve first position illustrated in FIG. 3A and a sliding valve second position illustrated in FIG. 3B, sliding valve 314 comprising a first end 330 and a second end 332, first end seal means 310 (preferably an O-ring seal) adjacent first end 330 and second end seal means 312 (preferably an O-ring seal) adjacent second end 332 to substantially prevent gas leakage between sliding valve 314 and internal gas passage 306 past first end seal means 310 and second end seal means 312. A circumferential groove 340 is formed on sliding valve 314 between first end seal means 310 and second end seal means 312, and a longitudinal gas passage 350 provides communication from first end 330 to second end 332. A sliding valve driver 360 is sealingly and slidably movable within hollow internal gas passage 306 and coupled via valve driver linkage 333 to sliding valve 314 to impart motion to sliding valve 314 with respect to internal gas passage 306 (motion as indicated by arrows on valve driver 360 in FIGS. 3A and 3B). Valve driver 360 comprises circumferential seal means 335 (preferably an O-ring seal) contacting hollow internal gas passage 306 to substantially prevent leakage of gas past seal means 335 between valve driver 360 and hollow internal gas passage 306. Valve driver 360 may be actuated manually or by means analogous to those applicable to piston driver 206 in FIGS. 1A and 1B. Valve driver linkage 333 preferably comprises a substantially rigid connector (e.g., a machine screw) which imparts motion to sliding valve 314 from valve driver 360 without substantially obstructing substantially free flow of gas between transducer access port 302 and mixing vessel access port 304 through longitudinal gas passage 350 when sliding valve 314 is in a sliding valve second position illustrated in FIG. 3B.

As an illustration of the operation of calibration valve 29, with sliding valve 314 in the sliding valve first position illustrated in FIG. 3A, transducer access port 302 communicates with vacuum port 322 through hollow internal gas passage 306 and sliding valve circumferential groove 340. However, at the sliding valve first position illustrated in FIG. 3A, transducer access port 302 is not in communication with mixing vessel access port 304. On the other hand, when sliding valve 314 is in the sliding valve second position illustrated in FIG. 3B, transducer access port 302 communicates with mixing vessel access port 304 through sliding valve longitudinal gas passage 350. As illustrated in FIG. 3B, however, transducer access port 302 is not in communication with vacuum port 322 at sliding valve second position.

The means by which each valve 22, 17, 26, 29 communicates with vessel 20 (i.e., allows for gas flow and/or pressure equalization between the respective valve and vessel 20) need not be as illustrated in FIG. 2 as long as the functions described below may be accomplished.

Vacuum valve 22 communicates with a vacuum line or vacuum pump (not shown) for the purpose of evacuating mixing vessel 20 prior to the addition of gases to be mixed therein through one or more of gas metering valves 15A–D. In preferred embodiments, vent valve 17 allows discharge to atmosphere or a collection system (not shown) of at least a portion of the gaseous contents of mixing vessel 20 during purging of mixing vessel 20 to eliminate trace quantities of one or more gases. That is, vent valve 17 is provided to allow gas within mixing vessel 20 at a pressure greater than ambient pressure to escape passively and thereby reduce the gas pressure within mixing vessel 20 substantially to ambient pressure. If a relatively high flow capacity vacuum system communicates with vacuum valve 22, so that the vacuum system would not be caused to malfunction when connected to a pressurized mixing vessel 20, then venting mixing vessel 20 through vent valve 17 becomes unnecessary. If, on the other hand, vacuum valve 22 communicates with a relatively low capacity vacuum pump, then any pressure above ambient in mixing vessel 20 is preferably reduced first by venting through vent valve 17 prior to evacuating mixing vessel 20 through vacuum valve 22.

Product output valve 26 allows discharge to an instrument or collection system (not shown) of blended gas of predetermined composition from mixing vessel 20. Gas blender 99 also comprises an absolute pressure transducer 30 coupled to mixing vessel 20 (preferably through calibration valve 29) and capable of producing an output signal (preferably electrical) indicative of the absolute pressure within vessel 20. In the preferred embodiments of gas blender 99 illustrated in FIG. 2, the output signal of transducer 30 is transmitted to a computer 40 via line 39, and valves 15A–D are controlled by a program within computer 40 via lines 41A–D respectively, while valves 26, 17, 22, 29 are controlled by a program within computer 40 via lines 42A–D respectively. Fan drive 11 is controlled by a program within computer 40 via line 48. The pressure transducer 30 is preferably directly mounted within the body of mixing vessel 20 to reduce the dead space within mixing vessel 20 associated with transducer 30 to substantially zero. Suitable transducers for this usage are well known to those skilled in the art, and are produced by various manufacturers in this country. Reference is made to U.S. Pat. Nos. 3,195,028; 3,271,669; and 3,318,153 for disclosures on the operation of pressure transducers, these patents being hereby incorporated by reference.

Mixing vessel 20 is necessarily one which provides a heat sink, or heat stabilizing means for rapid dissipation of heat flux associated with the gas blending operation. Thus, mixing vessel 20 might be heated using electricity or other forms of energy, or it might be provided with a jacket within which a fluid can be passed to facilitate heat exchange between mixing vessel 20 and the blended gases. Mixing vessel 20 might also be provided with various other heat exchange devices well known to those skilled in the art. In general, however, mixing vessel 20 is quite massive relative to the gaseous content introduced therein to provide a sufficient heat sink to hold the gas temperature substantially stable during the gas blending operation. For example, the mass of mixing vessel 20 would preferably be at least about 20 pounds, and more preferably ranges from about 30 pounds to about 42 pounds for a vessel having an internal volume of about 120 liters, the weight increasing proportionately as the internal volume of the vessel is increased. In certain preferred embodiments, mixing vessel 20 has a spherical shape and substantially comprises metal as, for example, stainless steel.

In a typical gas blending operation using gas blender 99, a gaseous blend can be formed from a plurality of gaseous components, for example: gaseous components $X_i$, where i equals 1, 2, 3 or 4, (from individual sources such as pressurized tanks, not shown). The desired percentage of each of component gases $X_i$ within the total gaseous mixture to be blended is entered into computer 40 by computer interface 45, for example, magnetic tape, keyboard (as schematically illustrated in FIG. 2), or punched card, or other analogous means. Computer 40 controls the flow of gases $X_i$ (not shown) into mixing vessel 20 by opening one or more of metering valves 15A–D in response to a predetermined program which has inputs comprising the desired percentage of each of component gases $X_i$, as well as the output signal from pressure transducer 30, the output signal being transmitted to computer 40 via line 39.

To produce a batch of blended gas of a predetermined desired composition, computer 40 typically executes a program comprising the steps of purging mixing vessel 20, evacuating the mixing vessel 20, introducing the desired component gases $X_i$ to the system in predetermined amounts while mixing the gases, and then transferring the blended gases to the user as needed, or to a secondary vessel.

In purging mixing vessel 20, a first component gas $X_1$ (generally the largest component gas of the blend desired) is introduced to mixing vessel 20 to dilute and carry off gas contaminants from the vessel. Mixing vessel 20 is vented through vent valve 17 and then substantially evacuated of the purging gas $X_1$ via vacuum valve 22, the absolute gas pressure within mixing vessel 20 thereby being reduced to a predetermined level. This completes one purging cycle, and similar cycles may be repeated to further reduce the concentration of any contaminating gases within mixing vessel 20. Predetermined amounts of the component gases $X_i$ are then added to the mixing vessel 20 according to a program within computer 40. Functional portions of this program are schematically illustrated in the flow chart of FIG. 4. Calculation of the desired partial pressures of each of the component gases $X_i$ in mixing vessel 20 for the final desired gas blend (FIG. 4, step 110) effectively predetermines the amount of each component gas $X_i$ which must be added to mixing vessel 20 to obtain the final gas blend.

For example, if the relative concentration of four component gases of an admixture is indicated by the order $X_1 > X_2 > X_3 > X_4$ in the final mixture, the component gases are introduced in the order $X_1$ followed by $X_2$, $X_2$ followed by $X_3$, and $X_3$ followed by $X_4$; each addition of a component gas being completed before the next component gas is introduced. The first component gas $X_i$ is added in an amount sufficient to increase the absolute pressure in mixing vessel 20 to a first predetermined level (i.e., the desired partial pressure for that component gas); the second component gas $X_2$ is then added to mixing vessel 20 in an amount sufficient to increase the absolute pressure in mixing vessel 20 to a second predetermined level; a third component gas $X_3$ is then added to the mixing vessel 20 in an amount sufficient to increase the absolute pressure in mixing vessel 20 to a third predetermined level; and this addition sequence is ended in the present example with addition of the fourth component gas $X_4$ which is added to mixing vessel 20 in an amount sufficient to increase the absolute pressure in mixing vessel 20 to a fourth predetermined level, thus forming the final desired gas blend.

In this example, the first predetermined absolute pressure level in mixing vessel 20 is substantially equal to the partial pressure of component gas $X_1$ in the final desired gas blend. Similarly, the difference between the first and second predetermined absolute pressure levels in mixing vessel 20 is substantially equal to the partial pressure of component gas $X_2$ in the final desired gas blend. Similarly, the difference between the second and third predetermined absolute pressure levels in mixing vessel 20 is substantially equal to the partial pressure of component gas $X_3$ in the final desired gas blend. Similarly, the difference between the third and fourth predetermined absolute pressure levels in mixing vessel 20 is substantially equal to the partial pressure of component gas $X_4$ in the final desired gas blend.

A typical blending cycle of operation employed in blending gas components $X_i$, where i equals 1, 2, 3 or 4, begins with the step of purging the system is described by reference to FIG. 2 as follows:

(1) With product output valve 26 and all of the metering valves 15 (i.e., 15A, 15B, 15C, and 15D) closed, open vent valve 17 to exhaust the contents of mixing vessel 20 to a venting system (not shown) at ambient pressure. When gas pressure within mixing vessel 20 substantially equals ambient pressure, close vent valve 17 and open vacuum valve 22. Then, at least partially evacuate mixing vessel 20, allowing gas pressure within mixing vessel 20 to reach a low preselected level, e.g., 5 pounds per square inch absolute (psia) or lower, before closing vacuum valve 22.

(2) Metering valve 15A, which communicates with a pressurized tank (not shown) containing the component gas $X_1$ of greatest concentration in the final desired blend, is then opened (i.e., the valve piston is moved through at least one injection cycle comprising a piston upstroke and a piston injection stroke). If during any metered gas addition, more than one valve injection cycle is required, valve injection cycles preferably occur in a burst of periodic (i.e., regularly timed) injection cycles, the frequency of which is preferably substantially equal to the fundamental resonant frequency of the valve or an integer multiple thereof. Gas $X_1$ is then added up to a preselected pressure level, e.g., 15 to 50 psia. The gas fills mixing vessel 20, after which metering valve 15A is closed and the contents of mixing vessel 20 are vented and evacuated again as above. Metering valve 15A is opened again to refill mixing vessel 20 with component gas $X_1$. Mixing valve 15A is again closed, vent valve 17 is then opened, and mixing vessel 20 is vented again. The cycle of filling mixing vessel 20 with component gas $X_1$, and thereafter purging mixing vessel 20 of component gas $X_1$ is conducted a plurality of times, usually about four times, until essentially all traces of any gaseous component other than component gas $X_1$ have been eliminated from the mixing vessel 20. The purge thus completed and mixing vessel 20 having a low internal pressure, e.g., 5 psia, or lower, mixing vessel 20 is now ready to receive the first permanent component gas of the final desired blend, that is, component gas $X_1$.

Figure 4:
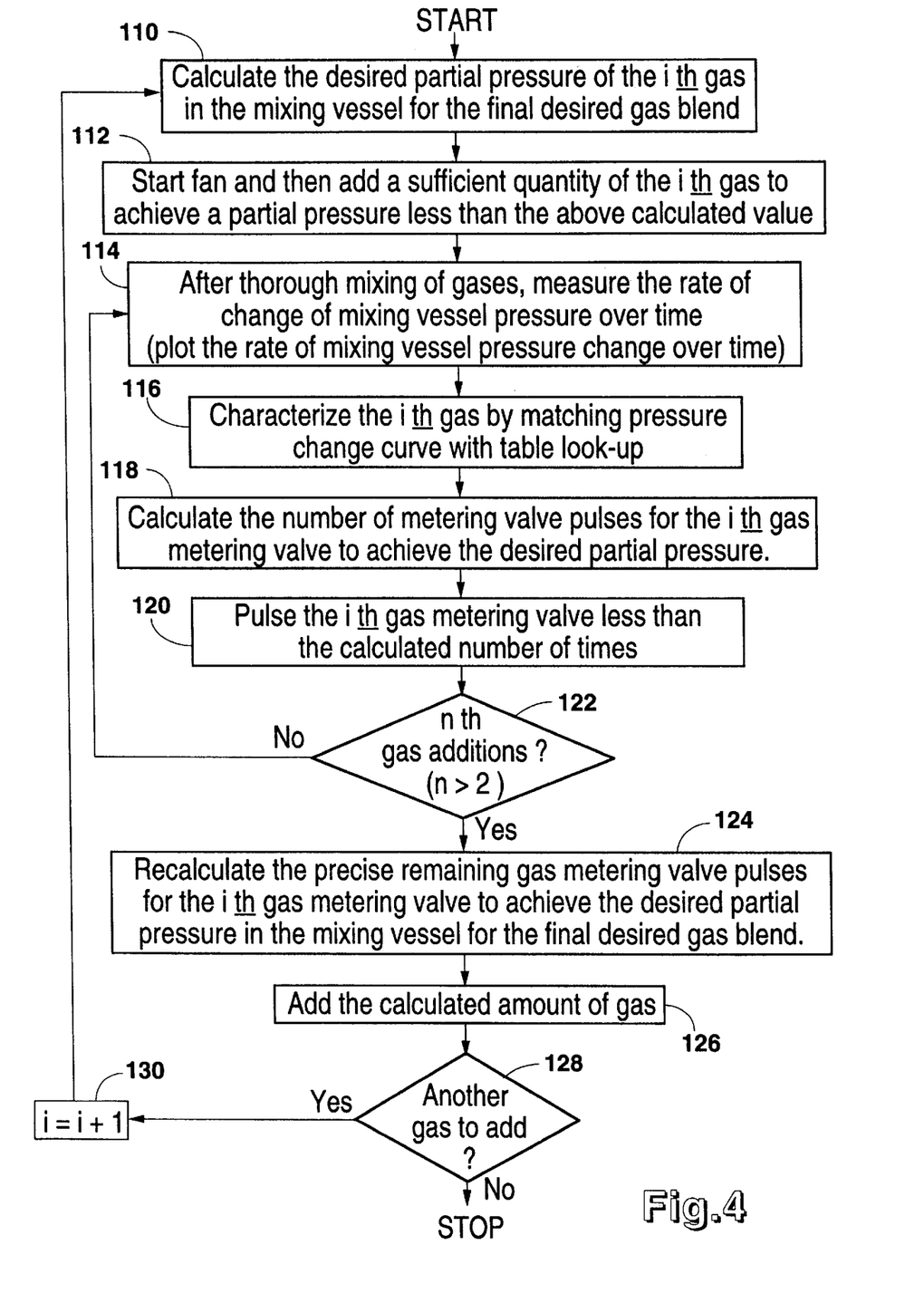
FIG. 4 schematically illustrates a flow diagram showing steps in the preparation of a final desired gas blend.

(3) See FIG. 4, step 112. With all valves closed and fan 10 driven by fan drive 11, valve 15A is opened and component gas $X_1$ enters mixing vessel 20 to achieve a partial pressure less (usually about 10% to 30% less, depending on the desired degree of precision in the final desired gas blend) than calculated for component gas $X_1$ in the final desired gas blend. Following the flow chart of FIG. 4, step 114, after thorough mixing of gases, the rate of change of pressure in mixing vessel 20 with respect to time is measured and plotted. Note that this may be accomplished by manual methods or (preferably) by computer 40.

(4) Component gas $X_1$ is then characterized, FIG. 4, step 116, by matching the plot of the rate of mixing vessel 20 pressure change over time just obtained for component gas $X_1$ with analogous plots obtained earlier for substantially all component gases and component gas concentrations of interest for the gas blender in question. Note that the above characterization of component gas $X_1$ by matching of plots may be accomplished by manual methods or (preferably) by a table look-up procedure using computer 40.

Having thus characterized component gas $X_1$, one may calculate, FIG. 4, step 118, (by manual methods or, preferably, using computer 40) how much of component gas $X_1$ must be added to mixing vessel 20 to achieve a partial pressure of component gas $X_1$ within mixing vessel 20 substantially equal to the desired partial pressure of component gas $X_1$ in the final desired gas blend. The quantity of component gas $X_1$ metered is optionally specified herein in terms of pulses, where one pulse is associated with each injection cycle of precision pulsatile metering valve 15A. This calculation of required metering valve pulses is based on stored experimental data (verified by analysis of final gas blends) recorded during earlier gas blending operations using mixing vessel 20, metering valve 15A, and a component gas substantially similar or identical to component gas $X_1$ in the approximate concentration and with substantially the same diluent gas(es) as in the current iteration.

Having made the above calculation of the required number of metering valve pulses to achieve the desired partial pressure of component gas $X_1$ in the final desired gas blend, valve 15A is pulsed (FIG. 4, step 120) less (usually about 10% to 30% less, depending on the final desired gas blend) than the calculated required number of pulses. If the resulting gas addition is the first or second addition of component gas $X_1$ to mixing vessel 20 after purging (see FIG. 4, step 122), the next step is to return to the mixing and measuring step (step 114) above. If the resulting gas addition is the third or greater addition (the exact number depending on the final gas blend) of component gas $X_1$ to mixing vessel 20 after purging, the next step is to recalculate (see FIG. 4, step 124), based, as above, on earlier-obtained and stored data, the precise remaining metering valve pulses for mixing valve 15A to achieve the desired partial pressure of component gas $X_1$ in mixing vessel 20 for the final desired gas blend.

Following the above recalculation, mixing valve 15A is pulsed the precise remaining metering valve pulses obtained (FIG. 4, step 126). In general, if more component gases $X_i$ are to be added to mixing vessel 20, (see FIG. 4, step 128), an analogous procedure to that in steps 3 and 4 above is followed for each component gas (the desired final gas blend partial pressure for the component gas having been calculated as in step 110), any remaining component gases being added in order, (see FIG. 4, step 130) based on their desired partial pressure in mixing vessel 20 for the final desired gas blend.

(5) To continue with the example above, with all valves closed and fan 10 driven by fan driver 11, metering valve 15B is opened and component gas $X_2$ enters mixing vessel 20 to a second preselected pressure set point level, e.g., 70 psia. The procedure for gas addition described above, referencing FIG. 4, for component gas $X_1$ is then followed. On injection of the last increment of component gas $X_2$ into mixing vessel 20, valve 15B is closed.

(6) To continue with the example above, with all valves closed and fan 10 driven by fan driver 11, metering valve 15C is opened and component gas $X_3$ enters mixing vessel 20 to a second preselected pressure set point level, eg., 80 psia. The procedure for gas addition described above, referencing FIG. 4, for component gas $X_1$ is then followed. On injection of the last increment of component gas $X_3$ into mixing vessel 20, valve 15C is closed.

(7) To continue with the example above, with all valves closed and fan 10 driven by fan driver 11, metering valve 15D is opened and component gas $X_4$ enters mixing vessel 20 to a second preselected pressure set point level, e.g., 85 psia. The procedure for gas addition described above, referencing FIG. 4, for component gas $X_1$ is then followed. On injection of the last increment of component gas $X_4$ into mixing vessel 20, valve 15D is closed and production of the final desired gas blend in mixing vessel 20 is complete.

Mixing vessel 20 can then serve as a storage vessel or the final desired gas blend can be transferred to a storage vessel for subsequent use.

(8) In the event transfer to a storage vessel is desired, product output valve 26 is now opened and, with all of component gas metering valves 15, vacuum valve 22 and vent valve 17 closed, the final desired blend of gases $X_1$, $X_2$, $X_3$, and $X_4$ is transferred from the mixing vessel 20 as a product.

One or more liquid components can also be added to mixing vessel 20 in predetermined quantities as by injection of the liquid directly through a septum inlet (not shown) in the mixing vessel 20. Liquid components may also be directly injected through a component gas metering valve inlet. Within mixing vessel 20, at least a portion of the liquid may then be evaporated and the resulting gas mixed with other component gases, whether such other components were originally introduced into mixing vessel 20 in gaseous or liquid form. Liquid components introduced into mixing vessel 20 can thus, after evaporation, form a portion of the final gaseous blend, the portion being related to the total volume of the gaseous blend by varying the pressure in the mixing vessel as described in U.S. Pat. No. 4,142,860, supra.

The gas blending functions described above are best conducted by use of a multicomponent valve, or valve assembly, which includes a plurality of component gas metering valve, a vacuum valve, a vent valve and a product output valve mounted within a single housing.

What is claimed is:

1. A gas metering valve, comprising
    a valve body comprising
        a hollow cylinder having a first end and a second end and a recess in said first end;
        a frusto-conically shaped gas outlet communicating with said recess in said hollow cylinder first end;
        an internal gas passage communicating with said hollow cylinder; and
        a gas inlet communicating with said internal gas passage;
    a piston having a first end, a second end, a seal retainer coupled to said first end, and a circumferential seal groove, said piston being sidably positionable within said hollow cylinder and at least a portion of said seal retainer being positionable within said hollow cylinder first end recess, said piston substantially occluding said internal gas passage when positioned proximate said hollow cylinder first end and substantially not occluding said internal gas passage when proximate said hollow cylinder second end;
    a piston driver coupled to said piston and said valve body to impart motion to said piston with respect to said hollow cylinder to slidably position said piston within said hollow cylinder;
    pressure drop control means for holding gas pressure drop across the metering valve substantially constant from pulse-to-pulse;

cylinder sealing means within said circumferential seal groove to substantially prevent gas leakage between said piston and said hollow cylinder before, during and after positioning of said piston within said hollow cylinder; and outlet sealing means coupled to said piston seal retainer.

2. A gas metering valve, comprising
a valve body comprising
a hollow cylinder having a first end and a second end and a recess in said first end;
a frusto-conically shaped gas outlet communicating with said recess in said hollow cylinder first end;
an internal gas passage communicating with said hollow cylinder; and
a gas inlet communicating with said internal gas passage;
a piston having a first end, a second end, a seal retainer coupled to said first end, and a circumferential seal groove, said piston being slidably positionable within said hollow cylinder and at least a portion of said seal retainer being positionable within said hollow cylinder first end recess, said piston substantially occluding said internal gas passage when positioned proximate said hollow cylinder first end and substantially not occluding said internal gas passage when proximate said hollow cylinder second end;
a piston driver coupled to said piston and said valve body to impart motion to said piston with respect to said hollow cylinder to slidably position said piston within said hollow cylinder;
spring gas adjustment means to facilitate use of various spring gas compositions and pressures;
cylinder sealing means within said circumferential seal groove to substantially prevent gas leakage between said piston and said hollow cylinder before, during and after positioning of said piston within said hollow cylinder; and
outlet sealing means coupled to said piston seal retainer.

3. The metering valve of claim 2 additionally comprising pressure drop control means for holding gas pressure drop across the metering valve substantially constant from pulse-to-pulse.

4. The metering valve of claim 1, 2 or 3 wherein said cylinder sealing means comprise at least one O-ring.

5. The metering valve of claim 1, 2 or 3 further comprising a recessed portion of said valve body adjacent said frusto-conically shaped gas outlet.

6. The metering valve of claim 1, 2 or 3 wherein said outlet sealing means comprise an elastomeric end cap coupled to said piston seal retainer.

7. A method of avoiding vibration-induced wear of the piston and cylinder of the metering valve of claim 2 or 3, the method comprising
connecting a source of spring gas to a spring gas pressure regulator of said spring gas adjustment means; and
adjusting said spring gas pressure regulator to a pressure sufficiently high to close the metering valve to effectively shock-mount the piston within the cylinder for avoiding vibration-induced wear.

8. A method of holding gas pressure drop across the metering valve of claim 1 or 3 substantially constant from pulse-to-pulse, the method comprising
connecting the metering valve to a mixing vessel;
connecting a gas source to a gas pressure regulator;
connecting a pressure-regulated gas outlet of said gas pressure regulator to said gas inlet of the metering valve; and
referencing gas pressure at said pressure-regulated gas outlet to gas pressure within said mixing vessel to hold gas pressure drop across the metering valve substantially constant from pulse-to-pulse.

9. A gas blender, comprising
a mixing vessel;
at least two gas metering valves as in claim 1, 2 or 3 mounted on said mixing vessel and communicating therewith for injecting gases into said mixing vessel;
a vacuum valve communicating with said mixing vessel for evacuating said mixing vessel;
an outlet valve communicating with said mixing vessel for withdrawing gases from said mixing vessel;
a circulating fan mounted on said mixing vessel for mixing gases within said mixing vessel; and
a pressure transducer mounted on said mixing vessel for producing an output signal indicative of measured gas pressure within said mixing vessel.

10. The gas blender of claim 9 additionally comprising a computer for controlling said gas metering valves, said computer being coupled to said pressure transducer output signal.

11. The gas blender of claim 10 additionally comprising a calibration valve for zero point calibration of said pressure transducer.

12. The gas blender of claim 11 additionally comprising a vent valve.

* * * * *